United States Patent Office 3,826,755
Patented July 30, 1974

3,826,755
PROCESS FOR PRECIPITATING METAL-CONTAINING COMPOUNDS AS GEL-PARTICLES DISPERSED IN AQUEOUS PHASE
John Herbert Grimes, Basingstoke, Kenneth Thomas Bartlett Scott, Reading, and Norman James McKenna, Tadley, England, assignors to United Kingdom Atomic Energy Authority, London, England
No Drawing. Filed Aug. 11, 1971, Ser. No. 170,994
Claims priority, application Great Britain, Aug. 26, 1970, 41,160/70
Int. Cl. B01j 13/00; C09k 3/00; G21c 19/42
U.S. Cl. 252—301.1 S           13 Claims

ABSTRACT OF THE DISCLOSURE

To a salt solution or hydrous sol of the metal or metals is added a polymer which is either a polysaccharide having a main chain of 1–6 linkages, or of 1–4 linkages with substituent groups having ether or ester linkages, e.g. guar gum, or a polyalcohol, e.g. polyvinyl alcohol, which complexes with the metal ions present. A precipitating reagent, e.g. an alkaline solution, is added gradually to the viscous mixture thus formed while agitating the mixture, resulting in the formation of a gel-particulate precipitate.

BACKGROUND OF THE INVENTION

This invention relates to the precipitation of metal-containing compounds.

In our British Patent Specification No. 1,175,834 there is described a process for forming *inter alia* particles of metal-containing compounds, e.g. spheres or irregular gravel. To a salt solution of the metal is added an organic polymer which forms a complex with the metal ions, and drops of this viscous mixture are caused to enter a further solution which precipitates the metal content of each drop as an insoluble compound bound to the polymer. The resulting entities can be easily filtered from the further solution and handled during further processing. The further solution is one which would react chemically with the initial salt solution to precipitate the desired compound. For example, to produce oxide particles, an alkaline solution which precipitates the metal as the hydroxide can be used.

The above-summarised process is valuable but is not always applicable. It is implicit in the process that an excess of the precipitating solution is present when reacting with each drop, and this may be a disadvantage. For example iron cannot easily be precipitated from a ferrous salt solution by dropping into ammonia, because any precipitate so formed tends to re-dissolve in the excess ammonia present. The same is true of chromium, copper, cobalt and nickel to an even greater extent. Again, the need for an excess of the precipitating solution adds to the expense of the process.

Our British Patent Specification No. 1,231,385 discloses a process having some resemblance to that described in Specification No. 1,175,834 but distinguished, *inter alia*, by starting from a sol of the desired metal instead of a true salt solution. This process too involves using an excess of the precipitating reagent, usually an alkali.

It is an object of the present invention to provide a process for precipitating metal compounds in a form which readily permits washing and filtering of the precipitate, and which does not require the use of an excess of the precipitating reagent.

SUMMARY OF THE INVENTION

According to the present invention, a process for precipitating a metal compound from a salt solution or hydrous sol of the metal as a gel-particle phase dispersed in an aqueous phase comprises: adding to the solution or sol a water-soluble polymer which forms a complex with the metal ions present in the solution or sol, the quantity of polymer being sufficient to form a viscous mixture; said polymer having a plurality of hydroxyl groups and being selected from the group consisting of polysaccharides having a main chain of 1–6 linkages; polysaccharides having a main chain of 1–4 linkages with substituent groups having ether or ester linkages; and polyalcohols; adding gradually to said viscous mixture a precipitating reagent capable of precipitating the compound from said solution or sol, while agitating the mixture to prevent consolidation of the precipitate; the concentrations of the metal solution or sol, of the polymer in solution and of the precipitating reagent being of such magnitude and in such proportions that the precipitate is formed as said gel-particle phase dispersed in said aqueous phase, and not as a continuous gel phase.

The quantity of precipitating reagent added depends upon the circumstances. Where it is desired to precipitate only part of the metal content of the salt solution or hydrous sol, the quantity added will be less than the stoichiometric quantity required to precipitate all of the metal content.

Where it is desired to precipitate all of the metal content but the precipitate is soluble in an excess of the precipitating reagent, the quantity added must not substantially exceed the stoichiometric quantity required to effect precipitation. The amount by which the precipitating reagent may exceed the stoichiometric quantity depends on the solubility of the desired precipitate therein. For example, as is known, nickel, copper, cobalt and chromium readily form soluble complexes with ammonia, whereas ferrous iron does so somewhat less readily. Therefore, when using ammonia gas or solution as the precipitating reagent, a greater excess of reagent over the stoichiometric quantity is permissible (to ensure precipitation of all the metal) in the case of ferrous iron than with the other four metals named above.

Where the precipitate is not soluble in excess of the precipitating reagent the quantity added is not critical and may substantially exceed the stoichiometric quantity to ensure complete precipitation.

The gradual addition of the reagent to the viscous mixture may be effected by running a liquid reagent into the viscous mixture while the latter is stirred or otherwise agitated. Alternatively a gaseous reagent may be bubbled into the viscous mixture, in which case the bubbling action itself may provide sufficient agitation. Again, the viscous mixture and a liquid reagent may be fed at controlled flow-rates to a mixing pump. It is a feature of such pumps that a high degree of agitation of the feed liquids takes place therein during mixing.

Where precipitation is to be effected from a hydrous sol of the metal, the selected polymeric organic compound must be one which does not react with the sol to produce a precipitate before adding the precipitating reagent.

As already stated, the polysaccharides used in the present process all have a main chain of 1–6 linkages, or of 1–4 linkages with ether or ester substituted linkages in their molecules. It has been found that the precipitates formed, e.g., by double decomposition, in the presence of these polymers have better filtration and settling properties than those obtained in their absence or with well known colloidal flocculating agents such as gelatin. Washing and other after-treatment liquid processes are also much more easily performed. This is because the particulates obtained have the nature of a true, homogeneous gel, and not an aggregation of microcrystalline particles, apparently because the molecular structure of these polymers is particularly adapted to complex formation with metal ions. Evidently the orientation of the hydroxyl groups in polyalcohols such as polyvinyl alcohol is also conducive to the formation of good gels.

Polysaccharides which have been found particularly suitable in the present process include the following:

Dextram, which has a main chain of 1-6 linkages.

Galactomannan gums (carob and guar) which have a main chain of 1-4 linkages with ether-linked side chains.

Cellosize, a hydroxyethyl cellulose, i.e. a substituted cellulosic compound made by Union Carbide, which has a main chain of 1-4 linkages with ether-linked side chains.

Wisprofloc P, a cationic starch derivative having both amino and hydroxyl groups made by W. A. Scholten's Chemische Fabrieken N.V. of Holland, which has a main chain of 1-4 linkages with ether and/or ester linked side chains.

As already stated, of the polyalcohols polyvinyl alcohol has been found particularly suitable.

The precipitating reagent is selected according to the metal compound which it desired to precipitate. Where precipitation is to be effected from a salt solution, the reagent is one known to react with that solution to produce the desired precipitate, normally by a double decomposition. The latter will frequently be a hydrous metal oxide or hydroxide, in which case the reagent is suitably an alkaline solution, such as sodium or ammonium hydroxide or lime, or sodium carbonate; or an alkaline gas such as ammonia may be bubbled through the viscous mixture. Where a carbonate precipitating solution is used, the oxide of the metal or metals can readily be formed by heating the precipitated carbonate, as well known. As is also well known, uranium oxide is not normally produced by direct precipitation but by precipitation with ammonia as ammonium diurante, which is then heated to drive off ammonia and water.

Where precipitation is to be effected from a hydrous metal sol, the desired precipitating reagent is suitably an alkaline solution or gas known to effect precipitation of the sol per se.

Known acidic precipitating reagents can also be used.

Other gel particle precipitates which can be obtained by such double decompositions include, for example, metal phosphates, sulphides, titanates, silicates, aluminates and tungstates.

The proportions and concentrations of the metal salt or sol, the polymer and the precipitating reagent are not critical and can be varied within wide limits, as the subsequent Examples show. Appropriate values (and a suitable polymer) can be determined by similar simple experiments for each particular application of the process, taking economic factors into account. Frequently some of these values will be fixed by the nature of the starting solution or sol, for example where the process is used to extract metals present in low concentration in an existing industrial effluent. As a rough guide it will usually be found that a suitable concentration of added polymer lies in the range of 1-100 g. per litre of the starting solution or sol. In some applications, e.g., extraction from effluents, it is important to add the minimum amount of polymer, in order to make the process economic.

Metals which can be precipitated from solutions of their salts or sols by the present process include iron, barium, chromium, copper, cobalt, nickel, zinc, yttrium, zirconium, thorium, uranium, tungsten, manganese, lead, titanium and aluminum, but this list is not exclusive.

The present process is to be distinguished from those described in U.S. Patents Nos. 3,202,556 and 3,301,723 in which aqueous explosive mixtures containing galactomannan gums are gelled by mixing therewith small quantities of compounds of specified metals which act as cross-linking agents, and then adding alkali. The product of the latter processes is a continuous gel phase for use as an explosive, and not a particulate gel phase dispersed in, and separable from, an aqueous phase, which is the product of the present process.

The present process is also to be distinguished from the disclosure in German Patent No. 628,553, according to which metal hydroxide precipitates are flocculated by adding certain organic colloids to the metal solutions before precipitation. In this German Patent gelatin is used as the organic colloid. As will be shown, the particulate gel product obtained with gelatin is substantially less satisfactory than that obtained with the polymers used in the present process. This is because of the difference in the nature of the precipitates; that formed with gelatin is substantially an aggregation of microcrystalline particles such as occurs in normal flocculating processes, whilst the particulates formed in the present process are essentially of a gel nature. It is believed that this gel arises from the complexing properties of the selected polymers, whose molecular structures are particularly adapted to form complexes with metal ions.

The only polysaccharide mentioned in the German Patent is gum arabic, whose structure has a predominance of 1-3 linkages. The structure of gum arabic does not appear to have a suitable configuration for the formation of adequately strong complexes which will lead to a substantially true gel. As a result, the precipitate obtained with gum arabic is substantially less satisfactory than with the polymers of the present process, as will be shown.

The present process can be used to effect co-precipitation of a mixture of compounds of two or more metals by adding one or more organic polymeric compounds to mixed solutions or sols of the two or more metals or to a mixture of a sol and solution of the respective metals. The product of the present process is not, as might be expected, an amorphous sludge or slime which would be difficult to wash, filter and handle. Instead the precipitate is formed as discrete entities of irregular shape and sometimes of a rubbery consistency, which do not coalesce to a solid mass in the liquid. Although the shape of these entities cannot be controlled, e.g. to produce spherical particles, as in the process disclosed in the two aforementioned UK Specifications, this is not a disadvantage for many purposes.

The cake formed on filtration is generally solid, and where the precipitated entities are rubbery, is of an elastic consistency. This solid cake is, however, much easier to wash and handle than the slimy precipitates, e.g. hydroxides, which would be produced without the addition of the polymeric compound.

The precipitate, after washing and drying, may be further processed to produce a desired product. For example a precipitated oxide or hydroxide may be heated to drive off the organic polymer and leave the pure oxide. The latter may be reduced in suitable cases to give the metal.

In one application the present invention provides a process for producing the black magnetic oxide of iron, $Fe_3O_4$, used as a pigment, from a solution of a ferrous salt. This process comprises adding to the ferrous salt solution a water-soluble polymeric organic compound to form viscous mixture, adding to the viscous mixture a quantity of an alkaline precipitating reagent which does not substantially exceed the stoichiometric quantity required to precipitate the iron as a ferrous hydroxide gel, said quality of reagent being added gradually to said mixture while agitating the mixture to prevent consolidation of the precipitated gel, and thereafter bubbling oxygen through a suspension of the precipitate to oxidise the ferrous hydroxide gel to a gel of black magnetic iron oxide.

Suitably the ferrous salt is ferrous chloride, the alkaline reagent is ammonia solution, an the oxygen is bubbled through as air. The organic compound may be guar gum. The gradual addition may be effecting by running the precipitating solution slowly into the viscous mixture while stirring or otherwise agitating the latter. Alternatively the precipitating reagent may be ammonia gas which is bubbled through the viscous mixture; or the viscous mixture and a precipitating solution, e.g., ammonia solution, can be fed at substantially stoichiometric rates to a mixing pump.

Examples of the present process

To enable the nature of the present invention to be more readily understood, attention is directed to the following Examples of the preparation of metal-containing materials which embody the present process.

EXAMPLE 1

Black magnetic oxide of iron ($Fe_3O_4$) pigment

To a 300 ml. of a ferrous chloride solution (1.07 M in iron) was added 0.9 g. of guar gum and the solution stirred for 30 min.

A stoichiometric quantity of 0.880 ammonia solution, plus a slight excess, was run slowly into the stirred solution from a burette to precipitate the iron as a ferrous hydroxide gel precipitate. The excess did not exceed 5–10%, in order to prevent redissolving the precipitate. 400 ml. of demineralised water and 2 drops of a silicone antifoam agent were then added to the stirred suspension and compressed air bubbled through it for 2 hr. by means of a fritted glass bubbler. The precipitate darkened through dark green, blue-green to black and became magnetic.

The black magnetic product was washed by decantation with demineralised water until free of ammonium salts, filtered and allowed to dry in air at room temperature. The dried product was then ground and heated to 400° C. in inert gas for 30 min. to remove the guar gum and any other organic material and any water of hydration. The fired product was found by X-ray and chemical analysis to be high-purity $Fe_3O_4$.

EXAMPLE 1a

To 1 l. of an industrial chloride pickle liquor (76.8 g./l. Fe; (0.4 N in HCl) was added, with stirring, 3.9 g. of guar gum and the mixture diluted to 2 l. with water. 0.880 ammonia solution was added slowly to the stirred mixture until all the iron was precipitated as ferrous hydroxide and the pH was about 8. Compressed air was bubbled through the resulting suspension, in the cold, by means of a fritted glass bubbler for 2–3 hrs. As in Example 1, the precipitate darkened and became magnetic.

The black precipitate was washed and processed as in Example 1 and yielded a high-purity $Fe_3O_4$ having an average particle diameter of ~0.2 μm. compared with values of 0.4–0.5 μm. for the best commercial pigments, and having correspondingly superior staining properties.

EXAMPLE 2

Barium ferrite, $BaFe_{12}O_{19}$

To 300 ml. of a mixed solution of barium and ferric chlorides (3.58 M in iron and 0.298 M in barium) was added 1.5 g. of guar gum and the solution stirred for 30 min.

The barium and iron were then completely co-precipitated as a hydrous ferric oxide-barium carbonate gel precipitate by slowly adding a 10% sodium carbonate solution while stirring. The amount added exceeded the stoichiometric amount by about 5–10% to ensure complete precipitation. The precipitate was filtered, washed free of alkali with demineralised water and dried in a steam oven. The dried product, which was quite friable, was fired in air at 1080° C. for 90 min. X-ray analysis of the fired product showed it to be almost pure $BaFe_{12}O_{19}$.

EXAMPLE 2a

To 400 ml. of a mixed solution of 7.3 g. of barium chloride and 96.5 g. of ferric chloride dissolved in distilled water was added, with stirring, 1.5 g. of guar gum.

As in Example 1, the barium and iron were co-precipitated by the slow addition of a slight excess of a 10% sodium carbonate solution. The resultant precipitate settled readily and was easy to wash and filter. The over-dried precipitate corresponded to a ratio of $$BaO : Fe_2O_3$$

of 1:6 which was suitable for processing to $BaFe_{12}O_{19}$ ferrite.

EXAMPLE 3

Chromic oxide

To 300 ml. of chromic chloride solution (1 M in chromium) was added 0.25 g. of carob gum and the solution stirred for 1 hr.

The chromium was precipitated as a hydrous chromic oxide gel precipitate by the slow addition of a stoichiometric quantity of 0.880 ammonia solution with stirring. The permissible excess of ammonia over the stoichiometric amount was only about 1–2 drops, to avoid redissolving the precipitate. The precipitate was filtered, washed free of ammonium salts and dried in a steam oven, producing a friable product suitable for further processing.

EXAMPLE 4

Copper hydroxide: using guar gum and ammonia solution

To 100 ml. of a copper sulphate solution (0.8 M in copper) was added 0.5 g. of guar gum and the solution stirred for 30 minutes. A stoichiometric amount of 0.910 ammonia solution was added slowly with stirring to precipitate the copper as a copper hydroxide gel precipitate. As in Example 3 an excess of only a few drops was permissible, to prevent redissolution. The precipitate was filtered and thoroughly washed with demineralised water to remove ammonium salts. The rubbery precipitate was dried in a steam oven, producing a friable product suitable for further processing.

EXAMPLE 5

Copper hydroxide: using guar gum and sodium hydroxide

To 100 ml. of a copper sulphate solution (0.8 M in copper) was added 0.5 g. of guar gum and the solution stirred for 30 minutes. An amount slightly in excess of the stoichiometric amount of sodium hydroxide (2 M) was added with stirring to precipitate the copper as a copper hydroxide gel precipitate. The blue precipitate was filtered and thoroughly washed until the washings were neutral. The rubbery precipitate was dried in a steam oven, producing a friable product suitable for further processing.

EXAMPLE 5a

This example uses a lower gum-to-metal ratio than Example, 5, and is therefore more economical. To 1 l. of a copper sulphate solution (1.1 M in copper) was added 5 g. of guar gum and the solution stirred for 30 minutes. To this viscous solution was added 285 ml. or sodium hydroxide (approximately 8 M) with stirring. The deep blue gel precipitate was aged for 1 hour (at the end of this the precipitate was black). After washing by decantation with seventeen 1 l. volumes of demineralised water, the gel was dried at 95° C. overnight. The dry gel was sieved minus 100 mesh and then reduced in hydrogen to copper metal powder (oxygen~0.35%).

EXAMPLE 6

Copper hydroxide: using dextran and sodium hydroxide

To 100 ml. of a copper sulphate solution (0.8 M in copper) was added 5.0 g. of dextran and the solution stirred for 45 minutes. An amount slightly in excess of the stoichiometric amount of sodium hydroxide (1 M) was added with stirring to precipitate the copper as a copper hydroxide gel precipitate. The blue precipitate was filtered and thoroughly washed. The rubbery precipitate was dried to a friable product.

EXAMPLE 7

Cobalt hydroxide: using guar gum and sodium hydroxide

To 100 ml. of a cobaltous chloride solution (0.5 M in cobalt) was added 0.3 g. of guar gum and the solution stirred for 30 minutes. An amount of sodium hydroxide (4 M) slightly in excess of stoichiometric was added with stirring to precipitate the cobalt as a cobaltous hydroxide gel precipitate. The precipitate, initially blue, turned pink on standing. After filtering and thoroughly washing, the rubbery precipitate was dried in air to a friable product. Ignition of this hydroxide gel in air at 600° C. for two hours gave black cobaltosic oxide $Co_3O_4$ (Carbon=0.01%, Co=71.4%).

EXAMPLE 7a

This example uses cobalt sulphate, which is cheaper than the cobalt chloride of Example 7. To 1 l. of cobalt sulphate solution (0.4 M in cobalt) was added 3 g. of guar gum with stirring for 30 minutes. To this viscous solution was added sodium hydroxide (8 M) with stirring to pH 9. The gel precipitate was aged for 1 hour before washing with 1 l. aliquots of demineralised water until the washings were sulphate-free. After drying at 95° C. overnight the hydroxide gel was reduced in hydrogen at 750° C. to give cobalt metal powder (Oxygen=0.2%).

EXAMPLE 8

Cobalt hydroxide: using carob gum and sodium hydroxide

To 100 ml. of a cobaltous chloride solution (0.5 M in cobalt) was added 0.6 g. of carob gum and the solution stirred for 30 minutes. A stoichiometric amount of sodium hydroxide (2 M) was added with stirring to precipitate the cobalt as a basic cobaltous chloride gel precipitate. The green rubbery precipitate was easily washed; on drying a friable product was obtained.

EXAMPLE 9

Nickel hydroxide

To 100 ml. of a nickel chloride solution (0.5 M in nickel) was added 0.5 g. of guar gum and the solution stirred for 30 minutes. An amount slightly in excess of the stoichiometric amount of sodium hydroxide (2 M) was added with stirring to precipitate the nickel as a nickel hydroxide gel precipitate. The green precipitate was filtered and thoroughly washed with demineralised water. The tough elastic precipitate was dried in a steam oven producing a friable product suitable for further processing to nickel oxide or nickel.

EXAMPLE 10

Nickel carbonate

To 50 ml. of a nickel chloride solution (0.5 M in nickel) was added 0.2 g. of guar gum and the solution stirred for 30 minutes. An amount very slightly in excess of the stoichiometric amount of sodium carbonate (0.7 M) was added with stirring to precipitate the nickel as a basic nickel carbonate gel precipitate. The pale green rubbery precipitate was thoroughly washed; on drying a friable product was obtained.

EXAMPLE 11

Ferrous hydroxide: using guar gum and sodium hydroxide

To 100 ml. of a ferrous chloride solution (1.0 M in iron) was added 0.25 g. of guar gum and the solution stirred for 30 minutes. An amount slightly in excess of the stoichiometric amount of sodium hydroxide (2 M) was added with stirring to precipitate the iron as a ferrous hydroxide gel precipitate. After filtering, the blue-green precipitate was readily oxidised by the air. A friable product was obtained on drying.

EXAMPLE 11a

This example uses ferrous sulphate, which is cheaper than the ferrous chloride of Example 11. To 1 l. of a ferrous sulphate solution (1.25 M in iron) was added 2.5 g. of guar gum and the solution stirred for 30 minutes. To this viscous solution was added a slight excess of sodium hydroxide (8 M) with stirring. After ageing the hydrous gel precipitate for 1 hour it was washed by decantation with demineralised water (fifteen 1 l. washes). After drying at 95° C. the dried ferric oxide gel was sieved minus 100 mesh and then reduced in hydrogen to iron metal powder (oxygen=0.15%).

EXAMPLE 11b

Ferrous hydroxide: using guar gum and calcium hydroxide (lime)

To 250 ml. of a ferrous chloride solution (90 g. Fe/l.) was added 0.625 g. of guar gum and the solution stirred for 30 minutes. To this viscous solution was added a slurry of 30 g. of calcium hydroxide (which is very cheap) in 100 ml. of water with stirring. After ageing, a very similar precipitate to that of Example 11a was obtained.

EXAMPLE 12

Ferrous hydroxide: using carob gum and sodium hydroxide

To 100 ml. of a ferrous sulphate solution (1.0 M in iron) was added 0.25 g. of carob gum and the solution stirred for 30 minutes. An amount slightly in excess of the stoichiometric amount of sodium hydroxide (2 M) was added with stirring to precipitate the iron as a ferrous hydroxide gel precipitate. After filtering, the blue-green precipitate was readily oxidised by the air. A friable product was obtained on drying.

EXAMPLE 13

Ferric hydroxide

To 100 ml. of a ferric chloride solution (1.9 M in iron) was added 0.2 g. of guar gum and the solution stirred for 30 minutes. An amount slightly in excess of the stoichiometric amount of 0.936 ammonia solution was added with stirring to precipitate the iron as a hydrous ferric oxide gel precipitate. The dark brown precipitate filtered easily and was easily washed free of ammonium salt. On drying a friable product was obtained which was suitable for further processing, e.g. hydrogen reduction to iron metal powder.

EXAMPLE 14

Mixed ferric/chromic/nickel oxide

To 100 ml. of a solution containing ferric nitrate, chromic chloride and nickel chloride (Fe:Cr:Ni ratio 74:18:8, total metal concentration 100 g./l.) was added 0.5 g. of guar gum and the whole stirred for 30 minutes. An amount very slightly in excess of the stoichiometric amount of sodium hydroxide (4 M) was added with stirring to precipitate the metals as a hydrous oxide gel precipitate. An easily washed rubbery precipitate was obtained which on drying gave a friable product suitable for further processing, e.g. reduction to give stainless steel powder.

EXAMPLE 15

Mixed zinc/iron oxide

To 300 ml. of a solution containing zinc sulphate (0.4 M in zinc) and ferric nitrate (0.8 M in iron) was added 1.5 g. of guar gum with stirring for 30 minutes. To this viscous solution was added 165 ml. of sodium hydroxide (approximately 6 M) with stirring. The brown gel precipitate was aged for 30 minutes before washing with demineralised water by decantation until the washings were essentially sulphate-free. The over-dried gel precipitate corresponded to a ratio of $ZnO:Fe_2O_3$ of 1:1 and was suitable for processing to zinc ferrite, $ZnFe_2O_4$, which is a ferroelectric.

EXAMPLE 16

Mixed yttria/iron oxide

To 150 ml. of a solution containing ferric nitrate (0.5 M in iron) and yttrium nitrate (0.3 M in yttrium) was added 1 g. of guar gum with stirring for 30 minutes. To this viscous solution was added, with stirring, ammonium hydroxide to pH 8.5. The granular gel precipitate was aged and then thoroughly washed with demineralised water. The oven-dried gel was suitable for processing to yttrium-iron garnet, $Y_3Fe_5O_{12}$.

EXAMPLE 17

Mixed thorium/ammonium diuranate

To 100 ml. of a nitric acid solution (2 M) containing uranyl nitrate (0.42 M in uranium) and thorium nitrate (0.42 M in thorium) was added 1 g. of dextran (M. wt. $5.10^5$) with stirring for 30 minutes. To this viscous solution was added ammonium hydroxide (approximately 8 M), with stirring, to pH 8. The yellow granular gel precipitate was aged for 30 minutes and then thoroughly washed in demineralised water. The oven-dried gel was suitable for further processing to a mixed thoria-urania powder for nuclear applications.

EXAMPLE 18

Mixed zirconia/aluminia/silica

To 200 ml. of water containing aluminium nitrate (0.146 M in aluminium) and zirconyl nitrate (0.023 M in zirconium) were added 8 g. of micro-silica powder (0.134 moles) and, after dispersion, 1.25 g. of guar gum was added and the solution stirred for 30 minutes. To this viscous solution was added ammonium hydroxide, with stirring to pH 8. The cream-coloured gel precipitate was thoroughly washed with demineralised water after being aged for 30 minutes. The oven-dried gel was suitable for ignition to the mixed oxide, which is used as a catalyst in the formation of pyridic bases from aldehyde-ammonia mixtures.

EXAMPLE 19

Tungstic acid gel

To 250 ml. of a sodium tungstate solution (0.5 M in tungsten) was added 2 g. of guar gum with stirring for 30 minutes. The solution was heated to 70° C. A slight excess of 50% nitric acid was added slowly with stirring to precipitate a $\beta$-tungstic acid gel. The gel precipitate was aged for 1 hour and then thoroughly washed with demineralised water and finally oven-dried at 95° C. Ignition in air gave the lime-green tungsten trioxide.

EXAMPLE 20

Copper hydroxide: using polyvinyl alcohol

To 50 ml. of a copper sulphate solution (1 M in copper) was added 50 ml. of a 10 wt. percent solution of polyvinyl alcohol with stirring. To the viscous solution was added a slight excess of sodium hydroxide (4 M). The dense deep-green gel precipitate, after ageing and thorough washing, was suitable for processing in a similar manner to that described in Example 5a.

EXAMPLE 21

Zirconia: using Cellosize

To 100 ml. of a zirconyl nitrate solution was added 5 g. of Cellosize with stirring for 30 minutes. To the viscous solution was added ammonium hydroxide (approximately 4 M) with stirring to pH 8. A dense precipitate was formed.

EXAMPLE 22

Cobalt hydroxide: using Wisprofloc P

To 200 ml. of a cobalt sulphate solution (0.4 M in cobalt) was added 0.5 g. of Wisprofloc P with stirring for 30 minutes. To this viscous solution was added a slight excess of sodium hydroxide (6 M) with stirring. After ageing the gel precipitate for 30 minutes, it was thoroughly washed with demineralised water. This gel precipitate was very similar to that prepared in Example 7a and was similarly suitable for processing to the oxide, $Co_3O_4$, or to cobalt metal powder.

EXAMPLE 23

Copper hydroxide: using Wisprofloc P

To 300 ml. of a copper sulphate solution (1.1 M in copper) was added 1.7 g. of Wisprofloc P with stirring for 30 minutes. To this viscous solution was added a slight excess of sodium hydroxide (8 M) with stirring. After ageing the gel precipitate for 30 minutes, it was thoroughly washed in demineralized water. The precipitate was very similar to that prepared in Example 5a and was suitable for similar processing.

EXAMPLE 24

Ferric oxide: using dextran

To 100 ml. of a ferric chloride solution (1 M in iron was added 3 g. of Dextran (M. Wt.=$5.10^5$) with stirring. To this viscous solution was added ammonium hydroxide with stirring to pH 7. The granular precipitate of a hydrous ferric oxide gel was readily washed.

EXAMPLE 25

Mixed ferric/chromic/manganese oxide

To 1 l. of a ferric nitrate solution (1.79 M in iron) was added 12 ml. of a chromium chloride solution (0.5 M in chromium), 22 ml. of a manganese chloride solution (0.5 M in manganese), colloidal carbon (10 g.) and 5 g. of guar gum with stirring over 30 minutes. To this viscous solution was added ammonium hydroxide (approximately 8 M) with stirring to pH 9. After ageing for 1 hour, the gel precipitate was washed with demineralised water. After drying, the hydrous oxide gel was reduced in hydrogen at 1100° C. for 5 hours to give an alloy powder (manganese 0.60%, chromium 0.31%, oxygen 0.15% and carbon 0.03%).

EXAMPLE 26

Lead zirconate-titanate

A mixed solution-sol of lead nitrate, zirconia and titania in the mole ratio $PbO_{1.0}ZrO_{20.65}TiO_{20.35}$ was made up by dispersing 3.78 g. of a dispersible titania gel (74% $TiO_2$) in 100 mls. of distilled water to form a sol and adding to it 20.72 ml. of a zirconia sol (386 g. $ZrO_2$/l). To the mixed sols was added 33.12 g. of lead nitrate dissolved in 200 mls. of distilled water.

The mixed solution-sol was diluted to 400 mls., and 25 mls. of a 10 wt. percent solution of polyvinyl alcohol in water was stirred in. The lead, zirconia and titania were then co-precipitated by the slow addition of 0.880 ammonia solution to pH 8. The resultant precipitate settled readily and was easily filtered and washed. On drying it was suitable for further processing to a lead zirconate-titanate ceramic.

EXAMPLE 27

Magnetic iron oxide pigment from red mud

To 200 ml. of a ferrous chloride solution (10% Fe) was added 1 g. of guar gum. To this solution, with stirring, was added 70 g. of red mud paste (40% water, 38.5% Fe on dried basis). The ferrous iron was precipitated by the slow addition of 0.880 ammonia solution to pH 8. The resultant stirred suspension was heated to 75.80° C. for 10 hrs. to allow the $FeO-Fe_2O_3$ reaction to form $Fe_3O_4$ to occur, (excess $Fe(OH)_2$ can be converted to $Fe_3O_4$ by blowing air through the suspension). The product is a magnetic brown-black hydrous iron oxide gel usable as a pigment.

EXAMPLE 28

Ferric oxide/thoria

To 2.5 l. of a ferric nitrate solution (2 M in iron) was added 32 ml. of a thorium nitrate solution (1 M in thorium). To this was added 15 g. of guar gum. Ammonium hydroxide was added dropwise to this viscous solution which was continuously stirred until neutrality was achieved. The gel precipitate so formed was allowed to age for 30 minutes for the reaction to complete. The precipitate was then washed 10 times with 2½ l. volumes of demineralised water, the water being removed after 20 minutes. After drying the gel precipitate it was reduced in hydrogen and compacted to form a solid bar of iron containing a submicron dispersion of thoria.

EXAMPLE 29

Chromic oxide/thoria

As in Example 28 except that 10 g. of guar gum was used and chromic nitrate was substituted for ferric nitrate to produce a chromium bar containing dispersed thoria.

EXAMPLE 30

Copper/zinc hydroxide

To 200 ml. of a solution (representing a brass etching solution) containing copper sulphate (0.75 M in copper) and zinc sulphate (0.07 M in zinc) was added 0.5 g. of guar gum with stirring. Slow addition of sodium hydroxide (6 M) to the stirred solution to pH 8.5 resulted in the complete recovery of the copper and zinc in the form of a readily filterable mixed hydroxide gel precipitate. Typically the copper and zinc concentrations remaining in solution were less than 1 p.p.m.

EXAMPLE 31

Zinc/iron/nickel/copper hydroxide

To 100 ml. of a solution (representing an industrial waste solution) containing zinc chloride ($5.0 \times 10^{-3}$M in zinc), ferric chloride ($3.0 \times 10^{-3}$M in iron), nickel chloride ($3.1 \times 10^{-3}$M in nickel) and copper chloride ($1.6 \times 10^{-3}$M in copper) was added 0.5 g./l. of guar gum with stirring. Slow addition of sodium hydroxide (2 M) to the stirred solution to pH 10 resulted in the completed recovery of all four metal ions (leaving typically less than 0.1 p.p.m. of each metal in solution) in the form of a readily filterable hydroxide gel precipitate.

EXAMPLE 32

Chromium/iron/aluminum hydroxide

To 200 ml. of a solution (simulating an industrial waste solution) containing chromium sulphate ($9.4 \times 10^{-2}$M in chromium), ferric chloride ($8.9 \times 10^{-2}$M in iron) and aluminium sulphate ($18.5 \times 10^{-2}$M in aluminium) was added 0.5 g. of guar gum with stirring. Slow addition of ammonium hydroxide (4 M) to the stirred solution to pH 8.0 resulted in the complete precipitation of the metal ions (leaving typically less than 1 p.p.m. of each metal in solution) as a readily filterable hydrous oxide gel precipitate.

An indication of the relative effectiveness of different polymers in producing satisfactory gel precipitates can be obtained by measuring the settling rate in water of the precipitates produced under identical conditions by the precipitation of metal salt solutions containing the different polymers, using the same precipitating reagent. Rapidity of settling is a good indication of ease of filterability. It can also lead to improved process efficiency by reducing the time to carry out processes involving washing following by settling and decantation.

To four 200 ml. aliquots of a cobalt sulphate solution (0.43 M in cobalt) were added 0.5 g. of four different organic polymers, with stirring for 30 minutes. To each of these solutions was added dropwise 30 ml. of sodium hydroxide (6 M) with stirring. After ageing for 15 minutes, each precipitate plus supernatant was poured into a 1 l. measuring cylinder and water added to a total volume of 1 l. The settling rates for the four precipitates, prepared under almost identical conditions, are given in Table 1. It will be seen that the precipitates formed with guar gum and Wisprofloc P settled much more quickly than those formed with gum arabic and gelatin.

TABLE 1

| Volume cleared of precipitate (ml.) | Time taken (seconds) | | | |
|---|---|---|---|---|
| | Guar gum ppts. | Wisprofloc P ppts. | Gum arabic ppts. | Gelatin ppts. |
| 50 | 5 | 9 | 18 | 45 |
| 100 | 9 | 14 | 28 | 58 |
| 200 | 20 | 22 | 40 | 75 |
| 300 | 28 | 29 | 55 | 93 |
| 400 | 36 | 34 | 72 | 114 |
| 500 | 42 | 38 | 86 | 135 |
| 800 | 65 | 65 | 165 | 290 |

The comparative settling times for hydrous ferric oxide, hydrous ferric oxide-guar gum and hydrous ferric oxide-gelatin precipitates prepared under identical conditions by the precipitation of ferric chloride with ammonium hydroxide are given in Table 2. Again the superority of guar gum over gelatin is apparent.

TABLE 2

| Nature of precipitate | Time (seconds) for ppts. to clear a given volume |
|---|---|
| $Fe_2O_3$ | 1895 |
| $Fe_2O_3$-gelatin | 1695 |
| $Fe_2O_3$-guar gum | 630 |

Similarly, comparative settling times for hydrous cupric hydroxide, hydrous cupric hydroxide-guar gum, hydrous cupric hydroxide-Wisprofloc P and hydrous cupric hydroxide-polyvinyl alcohol (PVA) precipitates, prepared under identical conditions by precipitating copper sulphate with sodium hydroxide are given in Table 3.

TABLE 3

| Nature of precipitate | Time (seconds) for precipitate to clear a given volume |
|---|---|
| $Cu(OH)_2$ | 1140 |
| $Cu(OH)_2$-guar | 142 |
| $Cu(OH)_2$-Wisprofloc P | 92 |
| $Cu(OH)_2$-PVA | 415 |

The precipitates obtained by the use of the polymers of the present process have been examined by X-ray diffraction analysis. This has confirmed that they are substantially of a true gel nature. By contrast, the precipitates obtained in the absence of polymer, or by the use of flocculating agents such as gelatin, show a high degree of crystallinity.

It is believed that the superior filtration properties of precipitates produced by the present process, as evidenced by their more rapid settling rates, is a result of the formation of the precipitate as gel particles each of which exhibit a rubberiness and coherence which are particularly amenable to process handling. It is believed that these desirable properties are conferred by the degree of complexing which occurs with the selected polymers, and which leads to suppression of the microcrystalline or highly gelatinous type of precipitate normally formed in double decomposition processes.

The present invention is not limited to the use of the particular metals, polymeric organic additives and precipitating reagents disclosed in the foregoing Examples.

As already stated, the present process is not suitable where entities of defined size and shape are required, e.g.

spheres or extruded shapes. For such purposes the processes described in the two aforementioned UK Specifications are preferred. Where product shape is not important, the present process has advantages over those two processes, some of which have already been described herein. To summarize, the main advantages in hydrous metal oxide production are:

a. Hydrous metal oxides which are soluble in excess alkali can be prepared.
b. The economic use of alkali in large excess, as in those two processes, requires the return and make-up of the filtrate for re-use, leading to alkali losses and higher costs. The present process does not require a large excess of alkali.
c. The reduced alkali requirement permits reduced plant capacities for liquid handling and filtration, leading to lower costs.
d. The present process is more suitable where the filtrate is to be separated, e.g. where the requirement is to remove metal contaminants from process liquor wastes by precipitation and discharge the filtrate with a minimum of solids content to trade effluent.
e. The absorption of alkali by hydrous oxide gels is less than in the presence of excess alkali, leading to easier washing and lower costs.
f. The product is obtained as a coherent, particulate gel-precipitate having good settling and filtration characteristics.

We claim:

1. A process for precipitating, by a chemical reaction involving double-decomposition, a quantity of a metal compound from a salt solution or a hydrous sol of the metal as a gel-particle phase dispersed in a liquid aqueous phase comprising:
    adding to the solution or sol a water-soluble polymer which forms a complex with the metal ions present in the solution or sol, the quantity of polymer being sufficient to form a viscous mixture; said polymer having a plurality of hydroxyl groups and being selected from the group consisting of polysaccharides having a main chain of 1-6 linkages; polysaccharides having a main chain of 1-4 linkages with substituent groups having ether or ester linkages; and polyalcohols;
    adding gradually to said viscous mixture a precipitating reagent capable of precipitating the compound from said solution or sol in at least the chemically equivalent amount required to precipitate said quantity of metal, while agitating the mixture to prevent consolidation of the precipitate;
    the concentrations of the metal solution or sol, of the polymer in solution and of the precipitating reagent being of such magnitude and in such proportions that the precipitate is formed as said gel-particle phase dispersed in said aqueous phase, and not as a continuous gel phase.

2. A process as claimed in claim 1 wherein said group consists of the polysaccharides dextran, galactomannan gums, modified starches and substituted cellulosic compounds, and of the polyalcohol polyvinyl alcohol.
3. A process as claimed in claim 1 wherein said group consists of the polysaccharides dextran, guar gum and carob gum, and of the polyalcohol polyvinyl alcohol.
4. A process as claimed in claim 1 wherein the precipitating reagent is an alkali.
5. A process as claimed in claim 2 wherein the precipitating reagent is an alkali.
6. A process as claimed in claim 3 wherein the precipitating reagent is an alkali.
7. A process as claimed in claim 1 wherein the precipitating reagent is an acid.
8. A process as claimed in claim 1 wherein the amount of added precipitating reagent does not substantially exceed the stoichiometric amount required to precipitate substantially all the metal content of the solution or sol.
9. A process as claimed in claim 2 wherein the amount of precipitating reagent does not substantially exceed the stoichiometric amount required to precipitate substantially all the metal content of the solution or sol.
10. A process as claimed in claim 3 wherein the amount of precipitating reagent does not substantially exceed the stoichiometric amount required to precipitate substantially all the metal content of the solution or sol.
11. A process as claimed in any of claim 1 wherein the metal is selected from the group consisting of iron, barium, chromium, copper, cobalt, nickel, zinc, yttrium, zirconium, thorium, uranium, tungsten, manganese, lead, titanium and aluminium.
12. A process as claimed in claim 2 wherein the metal is selected from the group consisting of iron, barium, chromium, copper, cobalt and nickel.
13. A process as claimed in claim 3 wherein the metal is selected from the group consisting of iron, barium, chromium, copper, cobalt and nickel.

References Cited
UNITED STATES PATENTS

| | | | |
|---|---|---|---|
| 3,202,556 | 8/1965 | Chrisp | 252—316 X |
| 3,301,723 | 1/1967 | Chrisp | 252—316 X |
| 2,029,617 | 2/1936 | Hiers | 264—51 X |
| 2,671,758 | 3/1954 | Vinograd et al. | 252—309 X |
| 3,397,257 | 8/1968 | Brambilla et al. | 264—.5 |

FOREIGN PATENTS

| | | | |
|---|---|---|---|
| 658,256 | 10/1951 | Great Britain | 252—317 |

RICHARD D. LOVERING, Primary Examiner

U.S. Cl. X.R.

75—72, 82, 126 J, 130.5, 206, 211; 106—57, 304; 252—62.56, 62.57, 62.62, 62.63, 316, 317, 453; 264—0.5